United States Patent [19]

Parkinson

[11] 4,159,658
[45] Jul. 3, 1979

[54] ROTARY INDEX TABLES

[75] Inventor: Edward J. Parkinson, Shelton, Conn.

[73] Assignee: Bridgeport Machines Division of Textron Inc., Bridgeport, Conn.

[21] Appl. No.: 784,275

[22] Filed: Apr. 4, 1977

[51] Int. Cl.² .................. B23B 17/00; B23Q 17/00
[52] U.S. Cl. .............................. 74/813 L; 74/816; 74/826
[58] Field of Search ............ 74/813 L, 826, 816, 74/813 C; 188/366, 31, 60, 69; 92/35, 36; 192/85 R, 88 A

[56] References Cited

U.S. PATENT DOCUMENTS

| 3,463,284 | 8/1969 | Kampert | 92/35 X |
| 3,593,597 | 7/1971 | Jennings | 74/826 |
| 3,795,155 | 3/1974 | Price | 74/826 |
| 3,797,333 | 3/1974 | Maier | 74/813 L |
| 4,031,986 | 6/1977 | Thompson | 92/35 X |

Primary Examiner—Alan Cohan

Attorney, Agent, or Firm—Mattern, Ware, Davis & Stoltz

[57] ABSTRACT

An economical rotary index table holds workpieces on machine tool beds and tables, changing rotational position in angular increments with precision. Accurate angular indexing is achieved by a curvic coupling with meshing radial teeth disengageably connecting an axially movable locking plate to the juxtaposed facing rotational worktable member, separate and apart from the drive system. An annular, axially expansible pneumatic chamber is employed to engage and disengage the curvic coupling teeth, alternately locking the worktable in the desired angular orientation, and unlocking it for angular indexing movement. In the preferred embodiment, the movable angular indexing apparatus of the present invention incorporates automatic counting means for precisely determining the degree of rotation and automatic stop means for preventing further rotation when the desired position has been reached.

13 Claims, 7 Drawing Figures

ROTARY INDEX TABLES

BACKGROUND OF THE INVENTION

This invention relates to rotary worktables and indexing assemblies for use with machine tools.

Rotary worktables are well known in the prior art and have been employed in many systems for securing a particular workpiece for machining operations thereon. In order to position the particular workpiece so that the various machining operations can be performed at the precise location within the tolerances established, the rotary worktable is generally rotationally moved into various specific positions in order to provide the desired orientation for the workpiece. Typically, the rotary worktables are driven by worm gear drives which rotate the rotary worktable to the desired angular position. Unfortunately, the worm drives eventually develop inaccuracies in their tolerances due to wear on the drive teeth. As a result, the precision of these rotary tables deteriorates and their efficacy is progressively reduced.

Various rotary table indexing systems are typified by the following U.S. Pat. Nos.:
Price, 3,795,155;
Frank et al, 3,889,555;
Lahm, 3,717,912;
Johnson, 2,989,874;
Goebel, 3,724,291;
Mazue, 3,824,877;
Siebert, 3,772,961;
Wahlstrom, 2,771,169.

Many of these patents have the common deficiency of having the indexing system incorporated and formed as part of the rotary drive system. Because of the wear placed upon these rotary drive teeth in moving the rotary worktables into the desired position, the teeth become worn and the precision of indexing becomes lost.

The Price, Lahm and Goebel patents all show disengageable detents or radial "curvic coupling" teeth employed to determine the successive angular positions of rotary index tables, but they all employ complex and expensive disengaging mechanisms.

Consequently, it is a principal object of the present invention to provide an economical rotary worktable which incorporates a precision indexing control system which is separate from the drive mechanism for the rotary table.

Another object of the present invention is to provide a rotary worktable incorporating the characteristic features described above in which the indexing control system can be automatically activated and automatically controlled to move the workpiece into a desired position.

Another object of the present invention is to provide a rotary worktable having the characteristic features described above which is capable of functioning for long periods of time without any loss of precision due to wear.

A further object of the present invention is to provide a rotary worktable having the characteristic features described above in which the indexing system can maintain angular precision within two minutes of arc.

Still another object of the invention is to provide rotary worktables of this character incorporating a ring-shaped pneumatic chamber, axially expansible and contractible, to transfer the worktable between an angular indexing rotatable mode and a locked machining mode, while the rotatable worktable face is not shifted, but is retained axially unmoved.

Other more specific objects will in part be obvious and will in part appear hereinafter.

SUMMARY OF THE INVENTION

In the rotary worktable of the present invention, the drive function is separated from the indexing function by providing a rotary table which is driven by a conventional worm drive gear, with the rotary table also incorporating two facing sets of indexing control teeth, forming a curvic coupling. One tooth set is mounted to rotate integrally with the rotation of the worktable, while the other non-rotating tooth set is axially movable into and out of engagement with the first set. In this way, any desired indexed position can be secured by the engagement of the curvic coupling.

In the preferred embodiment, both sets of teeth forming the curvic coupling incorporate 144 teeth defining a complete circle, thereby providing indexing increments of 2.5°, accurate to two minutes of arc. Also, each tooth is substantially V-shaped in cross-section and has about an 80° included angle. The curvic coupling may incorporate any appropriate number of teeth desired to produce any required increment of angular indexing.

Furthermore, the preferred embodiment of the angular indexing system of the present invention incorporates fixed sensing means for counting each passing tooth rotating with the worktable in order to assure mating engagement at the desired position, with a pneumatic locking system being used to produce the desired mating engagement precisely at the desired position. Consequently, movement is initiated through the automatic means when the desired position is reached, and the axial movement causes the rotary table to stop its rotation in the desired position, in which it is locked with precision.

In the preferred construction, an annular spring-steel bellows or air diaphragm assembly is employed for providing the axial movement. When the compressed air is introduced into the interior of the bellows assembly, the bellows assembly is expanded and its walls are urged apart, and the axially movable tooth set of the curvic coupling moves into engagement with the rotatable tooth set. When air pressure is removed, compression coil springs incorporated in the system disengage the curvic coupling teeth, permitting the worm drive again to drive the table rotationally in the next angular indexing movement.

The invention accordingly comprises the features of construction, the combinations of elements, and the arrangements of parts which will be exemplified in the construction hereinafter set forth and the scope of the invention will be indicated in the Claims.

THE DRAWINGS

For a fuller understanding of the nature and objects of the invention, reference should be had to the following detailed description taken in connection with the accompanying drawings, in which.

DETAILED DESCRIPTION

Figure 1:
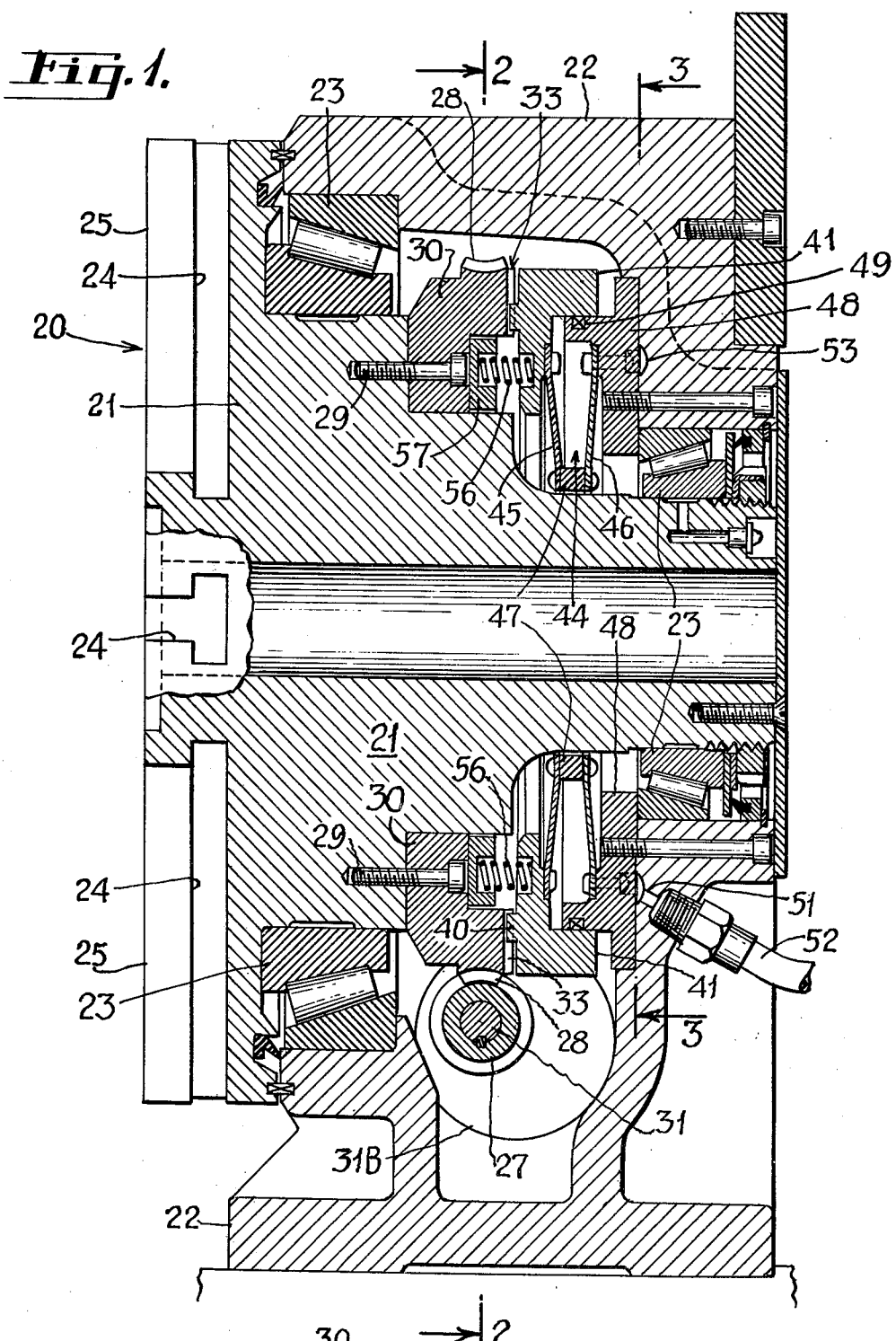
FIG. 1 is a cross-sectional side elevation view of the rotary worktable and indexing unit of the present invention.

In FIG. 1, a rotary worktable and indexing control unit 20 of the present invention is shown with a worktable casting 21 supported by a support housing 22, with a worktable 25 of casting 21 mounted in a vertical plane. Worktable 25 incorporates perpendicularly arranged "T" slots 24, which are well known in the art. In this way, any workpiece is quickly and easily clamped and bolted to worktable 25. For ease of description and understanding, the remaining specification describes unit 20 with worktable 25 in the vertical position on the bed or table of the machine tool. However, worktable 25 can be mounted horizontally without departing from the scope of this invention.

Worktable casting 21 is securely supported on housing 22 and adapted for rotational movement about its central axis. The rotational stability and capability of casting 21 is assured by incorporating two thrust roller bearing units 23 encircling the outer peripheral surface of casting 21. For example, these may be two preloaded Timken tapered roller thrust bearings, as shown in FIG. 1. The actual rotational movement of worktable 25 about its central axis is produced by worm gear 27 mounted to drive spindle 31. Worm gear 27 is drivingly engaged with gear teeth 28 formed on the periphery of worktable casting 21.

Figure 2:
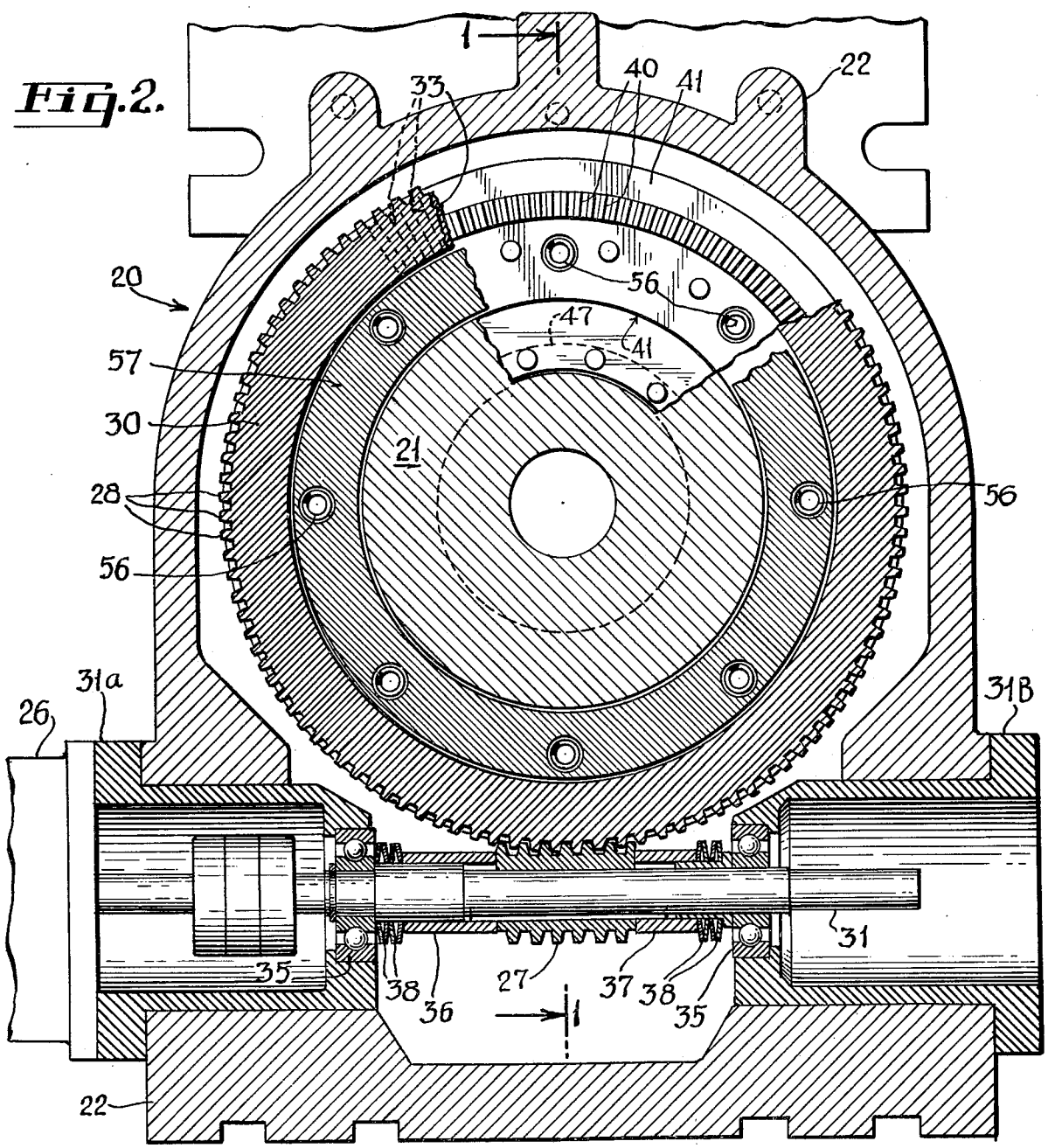
FIG. 2 is a cross-sectional front elevation view, partially broken away, of the rotary worktable and indexing control unit of the present invention taken along line 2—2 of FIG. 1.

As shown in FIG. 2, drive spindle 31 is rotationally mounted to housing 22 in bearings 35, and is driven at about 12½ rpm by motor 26, which may be a ⅓ HP motor such as a 1200 rpm. Indiana General Model 4530 90 volt DC motor, or any equivalent motor. The drive spindle assembly also incorporates sliding sleeves 36 and 37, and a plurality of sets of spring washers 38 mounted on both sides of worm gear 27. Preferably, spring washers 38 are Belleville washers. In this way, the entire drive assembly, including worm gear 27, is capable of lateral movement along the drive spindle axis. This is to enable the curvic coupling to register accurately should the worm be overdriven or underdriven where teeth on the fixed portion of curvic coupling do not align exactly with the rotating portion. This also permits quick indexing control stops and secure engagement of the indexing control curvic coupling teeth.

In the preferred embodiment, as shown in FIG. 1, drive teeth 28, which peripherally encircle casting 21, are formed in an annular tooth bearing member 30. Preferably, annular tooth bearing member 30 is bolted directly to casting 21 employing bolt means 29. When secured in position, tooth bearing member 30 peripherally encircles casting 21, with radially extending gear teeth 28 engaged in worm gear 27 on drive shaft 31. In this way, worktable 25 is controllably rotatable about its central axis without any freedom for axial movement along its central axis. Consequently, worktable 25 is always in direct driving engagement with its rotational drive system.

Opposite ends of drive spindle 31 are rotatably mounted in bearings carried by cartridges 31A and 31B, bolted in close fitting bores in the housing to preload the Belleville spring washers 38.

As discussed above, one of the major difficulties found in the prior art systems is the dual use of the drive system to function also as the indexing system. In the rotary worktable and indexing control unit 20 of the present invention, the drive function and the indexing function have been separated in order to provide a unit capable of indexing with greater precision, as well as having greater expected longevity without loss of precision due to wear.

CURVIC COUPLING INDEXING

The indexing function of the rotary worktable and indexing control unit of the present invention is achieved through an engageable and disengageable curvic coupling. The curvic coupling comprises two cooperating annular sets of engageable teeth, or V-shaped radial ridges and grooves, which can be engaged and disengaged upon command. Each set of teeth of the curvic coupling are equally spaced about a complete circle. Consequently, indexing in equal angular increments is assured.

One tooth set of the curvic coupling is formed on annular tooth bearing member 30. As shown in FIG. 1, the rotating tooth set 33 of the curvic coupling is formed on the substantially flat face of annular member 30.

The other half of the curvic coupling is non-rotating tooth set 40 which is formed on locking plate 41. Locking plate 41 is capable of axial movement only for engaging and disengaging with rotational tooth set 33. In this way, rotational tooth set 33 is rotationally moveable into the desired indexed position, while tooth set 40 provides the reference point and rotational stop.

Generally, the indexing function of rotary worktable and indexing control unit 20 of the present invention is achieved by automatically counting teeth 33 as the teeth rotate past a fixed point. When the desired number of teeth have been counted, the motor is braked, and locking plate 41 is automatically actuated and moves axially to engage the curvic coupling by causing tooth set 40 to engage with tooth set 33 around their entire juxtaposed facing circular arrays.

When both tooth sets 33 and 40 of the curvic coupling incorporate 144 teeth in the 360° circular band defined by the tooth array, indexing accuracy every 2.5° of rotation is provided. Any suitable number of teeth can be employed to produce any desired angular increments. It has been found that by providing a separate indexing function in which the indexing teeth are accurately counted and automatically stopped when the desired position has been reached, an extremely accurate indexing system is achieved. Furthermore, since the teeth of the curvic coupling are employed only for the indexing function, the wear typically experienced on drive teeth is eliminated and long life expectancy is inherently provided by the present invention.

Figure 6:
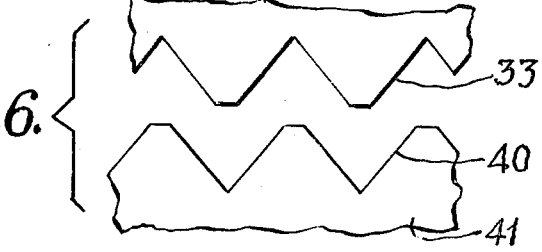
FIG. 6 is a schematic cross-sectional representation of the gear teeth employed in the curvic coupling of the present invention, taken along the line 6—6 in FIG. 5, shown in its disengaged position.

In FIG. 6, tooth sets 33 and 40 of the curvic coupling are shown in their preferred embodiment with an included angle of about 80° between each tooth defining side, and with their convex apices blunted. In this way, ease of engagement at the desired position is assured, without abrupt and tooth fracturing engagement being experienced, and division of engaging impacts among all pairs of coupling teeth further reduces shock hazards.

Figure 4:
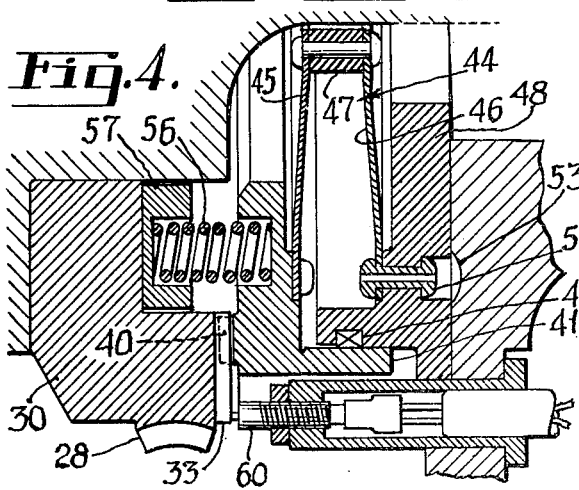
FIG. 4 is an enlarged cross-sectional side elevation view taken along line 4—4 of FIG. 3 showing the curvic coupling of the present invention in its engaged position.
Figure 5:
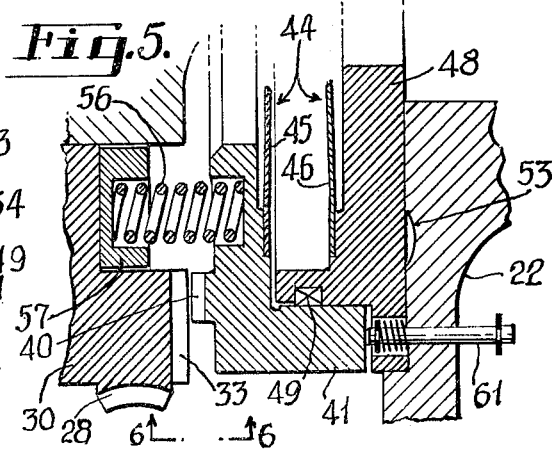
FIG. 5 is an enlarged cross-sectional side elevation view taken along line 5—5 of FIG. 3 showing the curvic coupling of the present invention in its disengaged position.

As briefly discussed above, the indexing control function of the present invention is achieved by employing a curvic coupling which is engageable and disengageable upon command. While tooth set 33 of the curvic coupling rotates with the worktable, tooth set 40 of locking plate 41 does not rotate, and moves axially upon command when the desired indexed position has been reached. The engagement and disengagement of tooth set 40 and the movement of locking plate 41 can best be understood by referring to FIGS. 1, 4 and 5. In FIG. 4, locking plate 41 is shown in its axially extended position with tooth sets 33 and 40 of the curvic coupling in their engaged position. In FIG. 5, locking plate 41 is shown in its retracted position, with tooth sets 33 and 40 disengaged.

PNEUMATIC LOCKING

The axial controlled movement of locking plate 41 along the central axis of casting 21 is achieved through the use of an air diaphragm or spring-steel bellows assembly 44. Bellows assembly 44 incorporates two substantially flat, ring-shaped spring-steel diaphragms 45 and 46, similar to large Belleville washers, combined with a sealing ring 47 and a fixed mounting plate 48. The spring-steel bellows assembly 44 is established by securing one edge of each of the spring-steel diaphragms 45 and 46 to sealing ring 47, while the other edge of spring-steel diaphragm 46 is riveted to mounting plate 48 and the other edge of spring-steel diaphragm 45 is riveted to locking plate 41. Bellows assembly 44 is completed by positioning sealing ring 49 between the juxtaposed facing surfaces of locking plate 41 and fixed mounting plate 48. In this way, a sealed chamber is established within bellows assembly 44 which completely peripherally encircles worktable casting 21.

Figure 3:
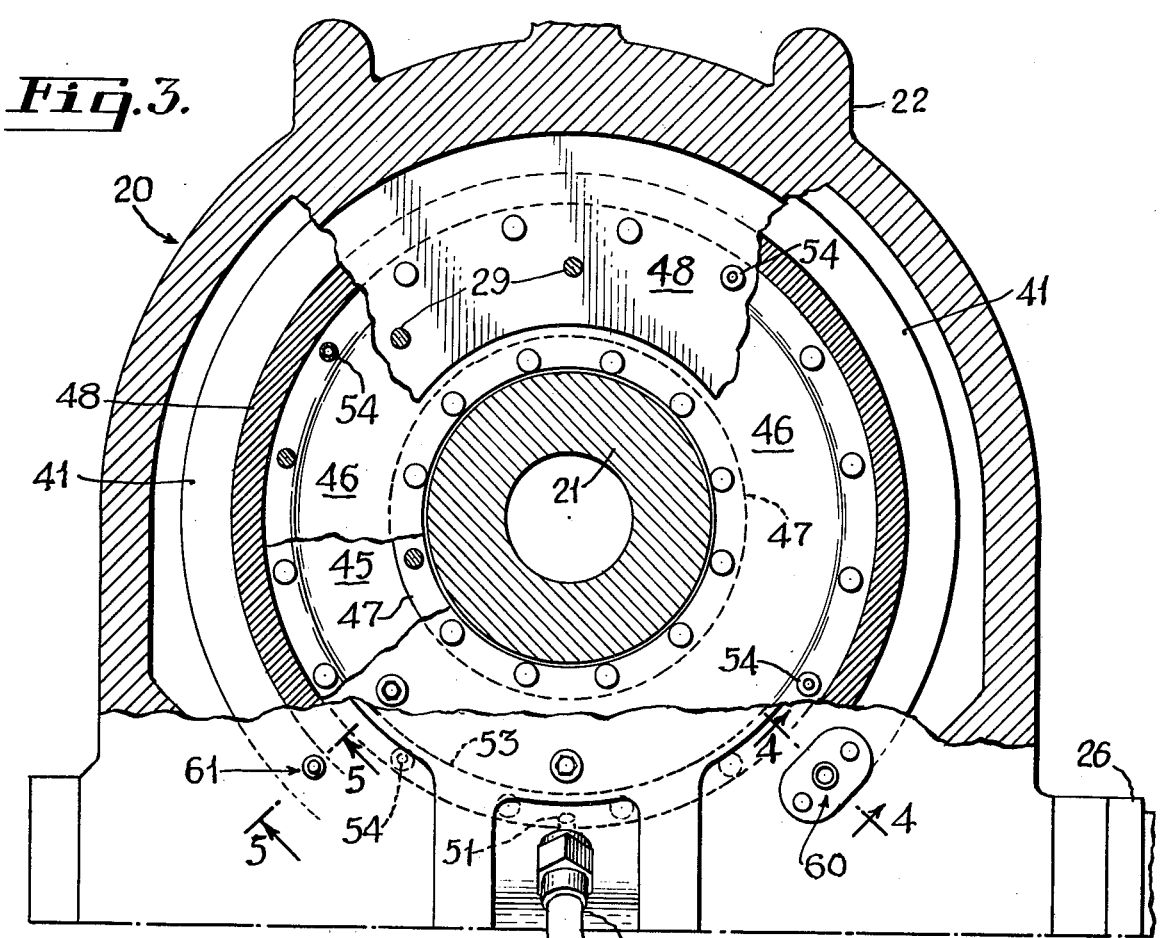
FIG. 3 is a fragmentary cross-sectional rear elevation view of the rotary worktable and indexing control unit of the present invention, taken along line 3—3 of FIG. 1.

Compressed air supplied from a compressed air source along supply line 52 is introduced into the sealed interior of bellows assembly 44 through an air inlet portal 51. The compressed air entering portal 51 is supplied to the interior of bellows assembly 44 through an annular groove 53 and hollow rivets 54. If desired, solid rivets may be used, with one or more portal apertures connecting groove 53 to the sealed interior of bellows assembly 44. Annular groove 53 carries the compressed air supply about the entire housing, with preferably at least four hollow rivets being mounted at equal distances about the assembly to assure an equalized and rapid supply of compressed air to the interior of bellows assembly 44. This distribution arrangement can be seen in FIG. 3.

Once compressed air has been introduced in the sealed interior zone of bellows assembly 44, the increased pressure therein urges spring-steel diaphragms 45 and 46 apart, causing locking plate 41 to move axially towards annular tooth bearing member 30. This axial movement is completed when teeth sets 33 and 40, forming the curvic coupling, are engaged.

In operation, annular tooth bearing member 30 with its associated tooth set 33 is rotated about the central axis of worktable 25 until the desired indexed position is reached. Once this position is reached, compressed air is automatically introduced into the interior of bellows assembly 44, causing locking plate 41 carrying tooth set 40 to rapidly move into engagement with tooth set 33, thereby preventing further rotation, locking worktable 25 in the desired indexed position.

When locking plate 41 is in its engaged position, eight helical coil springs 56 captive between locking plate 41 and a pressure plate 57 recessed in a groove in member 30 are in compression, maintaining ring-shaped pressure plate 57 against annular member 30. When disengagement is desired, the pressure within bellows assembly 44 is vented through hose 52, and coil springs 56 urge locking plate 41 back to its disengaged position. As shown in FIG. 5, when plate 41 is disengaged, annular tooth bearing member 30 and pressure plate 57 are in sliding engagement.

In the preferred embodiment, the eight coil springs 56 are distributed about ring-shaped pressure plate 57 at substantially equal distances from each other. Also, coil springs 56 are preferably pocketed in recesses in ring-shaped pressure plate 57 in order to prevent their dislodgement.

The actual movement of locking plate 41 need only be enough to securely engage and disengage the teeth of the curvic coupling. It has been found that a stroke of approximately 0.15 inches is sufficient and provides the secure and rapid engagement desired in order to assure indexing accuracy.

By referring to FIG. 4, the actual indexing control operation can best be understood. As shown therein, the rotating tooth set 33 of the curvic coupling incorporates teeth which extend radially outwardly beyond the radial length of non-rotating teeth 40. The extended radial length of teeth 33 is employed in combination with sensor 60 which counts the passage of each tooth 33 as it passes sensor 60 during the tooth's rotational movement. Sensor 60 may be an "Electro Digital" Magnetic Sensor #58405, for example, or any equivalent unit. The passage of each tooth is utilized with an electronic converter to give an automatic readout of the actual degrees of rotation achieved from the fixed starting point. When the desired angular indexed position is reached, the air pressure system is activated and the rotational movement of worktable 21 is halted through the engagement of the curvic coupling as described above. In the preferred embodiment, an electrodigital magnetic sensor is employed for tooth sensor 60.

As shown in FIG. 5, a spring loaded, two-position sensor pin 61 is employed in order to provide a direct readout of the actual position of engagement plate 41. Although sensor pin 61 can be connected in any way desired, it is preferred that a green light be displayed when the curvic coupling is engaged, as shown in FIG. 4, and a red light when the curvic coupling is disengaged, as shown in FIG. 5. The green light for the curvic coupling engagement is preferred, since this signals that the desired index position has been achieved and work can proceed. Consequently, the red light indicates that worktable 25 is in the process of being rotated to a desired indexed position and work should not be performed on the workpiece.

Figure 7:
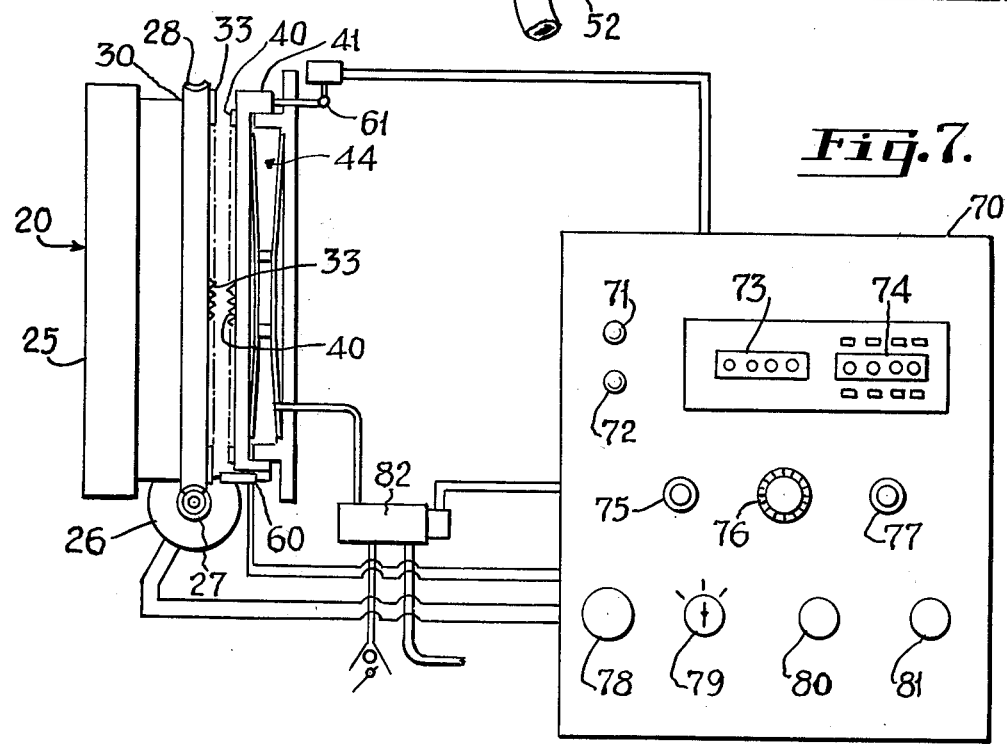
FIG. 7 is a schematic representation of the rotary worktable and indexing control unit of the present invention showing the automatic pneumatic or hydraulic operation and control panel.

By referring to FIG. 7, the electronic and pneumatic control of rotary worktable and indexing control unit 20 of the present invention can best be understood.

Control panel 70 incorporates all of the visual displays and manual controls required in order to position worktable 25 in any indexed location. Control panel 70 incorporates green light 71 and red light 72 for the visual display of the locked or unlocked position of the curvic coupling. Readout 73 shows the exact position of worktable 25 while settable readout 74 allows the operator to select any indexed position desired. While any equivalent units can be used, readout 73 may be a "Durant" Predetermining Solid State Control, Model 1000-411P, and readout 74 may be a "Durant" Model 1000-411D Predetermining Counter with dial-in capability, to allow the operator to "dial-in" the angular position required in the desired increments. Additional controls which have been provided for the convenience of the operator, but are not specifically required, are a fixed speed button 75, a variable speed control 76, and override button 77, an emergency stop button 78, a rotational direction control switch 79, start button 80, and a normal stop button 81. The rotational direction control switch 79 allows the operator to select either counterclockwise or clockwise rotation for worktable 25.

OPERATION

In operation, the operator, after setting worktable 25 to a particular reference position, would dial in the target index position employing setable counter 74. Then, either clockwise or counterclockwise rotation is selected. When rotational direction control switch 76 is turned to either counterclockwise or clockwise rotation, the unit is not started but, in the preferred embodiment, solenoid air valve 82 is activated to lock the curvic coupling, causing green light 71 to go on. Once the desired angular position is dialed in to display 74, start button 80 can be activated.

The activation of start button 80 also activates solenoid air valve 82 causing the pressurized air in bellows assembly 44 to be vented. In the preferred embodiment, solenoid air valve 82 comprises a three-way valve which supplies compressed air when energized and exhausts when deenergized so that the curvic coupling is always locked when air is supplied. When the compressed air has been exhausted from bellows assembly 44, the curvic coupling is unlocked and the red light goes on when sensor pin 61 is moved by locking plate 41. Then, motor 26 automatically starts the rotation of worktable 25.

As worktable 25 rotates, sensor 60 counts each of the teeth 33 as it passes sensor 60. The passage of each tooth will be displayed in counter 73 as degrees of rotation. When sensor 60 has counted a sufficient number of teeth to cause display counter 73 to show the required target which matches the predetermined setting on counter 74, motor 26 will be dynamically braked and solenoid air valve 82 will be energized to supply compressed air to bellows assembly 44. Once the curvic coupling is locked, sensor pin 61 causes green light 71 to go on.

When an operation has been completed on the workpiece in a particular indexed orientation, the next desired orientation can be dialed into display 74, in a cumulative number of increments, and the entire indexing process can be restarted.

Various alternative features can be incorporated into the basic concept of the present invention without departing from the scope of this invention. Such features can take a variety of forms in order to achieve the same desired results using slightly different techniques. One such alternative would be to employ a slow speed switch which is activated just prior to the targeted index position being reached. In this way, the motor would be going at a slower speed when stopped by the movement of engagement plate 41.

Another alternative system could be to employ a proximity switch which stops the motor just short of full count and an adjustable delay to stop the motor and engage the curvic coupling. It is also within the scope of the present invention that the rotary worktable and indexing control unit of the present invention can be used with a tape program which will operate the table and enable the table to be part of a programmed machine tool.

Another feature which has been incorporated into the present unit is an error control feature. If an error has been made in dialing a particular target, override button 77 of FIG. 7 can be pressed in order to provide immediate deenergization of solenoid air valve 82. This will exhaust the air from the bellows 44, disengage the curvic coupling and initiate the red light. In the preferred embodiment, motor 26 will automatically reverse direction and return the unit to zero. The operator then can restart the system by dialing in the correct index position.

Also, in the preferred embodiment, an emergency stop provision is incorporated into the unit in order to shut off all power to the panel for any emergency situation. Furthermore, as mentioned above in reference to panel 70, a fixed motor speed button as well as a variable motor speed control is incorporated in the preferred embodiment, in order to provide for maximum performance flexibility in any particular situation.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following Claims are intended to cover all of the generic and specific features of the invention herein described and all statements of the scope of the invention which, as a matter of language, might be said to fall therebetween.

Having described my invention, what I claim is new and desire to secure by Letters Patent is:

1. A rotary worktable and indexing control unit comprising:
   (A) a housing;
   (B) a worktable rotatably secured to the housing;
   (C) drive means for controllably rotating the worktable;
   (D) a curvic coupling incorporating
      (a) a first tooth member mounted for rotation with said worktable, and
      (b) a second tooth member mounted to the housing and movable from a first disengaged position to a second locking position engaged with the first tooth member, preventing rotation of the worktable; and
   (E) a bellows assembly, responsive to a pneumatic source for controlled expansion and contraction thereof, and comprising
      (a) two ring-shaped spring-steel members
         (1) sealingly interconnected at their respective interior edges, with (2) the exterior edge of one of said spring-steel members being secured to the housing; and (b) a movable locking plate having (1) the exterior edge of the other spring-steel member securely mounted to a portion thereof, and with (2) the second tooth member being mounted to another portion thereof, thereby controllably moving said second tooth member into and out of engagement with the first tooth member, and (F) control means for activating and deactivating the pneumatic source in response to the position of the worktable.

2. The rotary worktable and indexing control unit defined in claim 1, wherein said bellows assembly is further defined as incorporating a plurality of hollow rivets securing said ring-shaped spring-steel member to said housing and communicating with a recess formed in the housing, with said recess communicating to a pneumatic inlet portal, whereby the pressurized source delivers pressurized air directly to the interior of the bellows assembly through said inlet portal and said recess and through said hollow rivets, thereby allowing the bellows assembly to expand, moving the second tooth member into engagement with the first tooth member.

3. The rotary worktable and indexing control unit defined in claim 1, wherein said unit further comprises spring means securely positioned between the movable locking plate of the bellows assembly and the rotary worktable, whereby the spring means assist in the separation of the curvic coupling members when pressure has been removed from the bellows assembly.

4. The rotary worktable and indexing control unit defined in claim 3, wherein said spring means is further defined as comprising a plurality of coil springs peripherally interposed between the ring-shaped bellows assembly and the rotary worktable and securely mounted therebetween for non-rotating axial stability during rotational movement.

5. The rotary worktable and indexing control unit defined in claim 1, wherein the first tooth member is further defined as being annular shaped and securely mounted to the worktable.

6. The rotary worktable and indexing control unit defined in claim 5, wherein said annular member is further defined as incorporating rotational drive teeth peripherally encircling the annular member, substantially perpendicularly disposed to said first tooth member of the curvic coupling and engaged with said drive means.

7. The rotary worktable and indexing control unit defined in claim 5, wherein said first tooth member is further defined as comprising 144 teeth equally spaced angularly about its entire periphery, and the rotary worktable and indexing control unit is further defined as comprising:

G. tooth counting means securely mounted to the housing and positioned in juxtaposed spaced relationship to the annular shaped rotationally mounted first tooth member, whereby said counter precisely determines the exact location of the rotary worktable from a particular angular reference point in angular increments of 2.5° by counting the passage by said counter of each tooth of the first tooth member.

8. The rotary worktable and indexing control unit defined in claim 7, wherein said tooth counting means is further defined as communicating with the control means for activation of the pneumatic system when required.

9. The rotary worktable and indexing control unit defined in claim 1, wherein each member of the curvic coupling is further defined as comprising a plurality of teeth, each of said teeth having an included angle of about 80° between each tooth-defining side, thereby assuring positive and rapid, secure, fracture-free engagement thereof.

10. The rotary worktable and indexing control unit defined in claim 1, wherein said control means is further defined as comprising a solenoid connected to the pneumatic source and arranged for maintaining pneumatic pressure in the bellows assembly until the solenoid is activated.

11. A rotary worktable and indexing control unit comprising:

(A) a housing;

(B) a worktable rotatably secured to the housing;

(C) indexing drive means for controllably rotating the worktable and comprising (a) a drive spindle (b) a first rotation inducing drive gear peripherally surrounding the rotary worktable and mounted thereto, and (c) a second drive gear, and (1) engaged with the first drive gear (2) rotationally driven by the drive spindle, and (3) axially movable along the drive spindle, thereby preventing undesirable tooth stress and fractures due to sudden engagement of the position control system, and (D) an index position control system comprising:

(a) a first radial ridge-and-groove curvic coupling tooth member mounted for rotation with said worktable, (b) a second non-rotating radial ridge-and-groove curvic coupling tooth member engageable with said first tooth member mounted to the housing, and movable from a first disengaged position to a second rotation-preventing engaged position, and (c) movement control means connected to the second tooth member including a unitary expansible bellows assembly connected upon expansion for moving the second tooth member into its engaged position in response to the arrival of the rotary worktable at the desired indexed position.

12. The rotary worktable and indexing control unit defined in claim 11, wherein said second drive gear is further defined as comprising a worm having a hub collar peripherally surrounding the drive spindle and keyed therewith for rotational movement while being slidably movable along the central axis thereof and resiliently biased toward a centered neutral position.

13. The rotary worktable and indexing control unit defined in claim 12, wherein said drive means is further defined as comprising:

(d) a plurality of Belleville washers positioned about the drive spindle at opposed ends of the worm hub collar, thereby imparting flexible control to the lateral movement of the worm hub collar.

* * * * *